United States Patent [19]

Hayes

[11] Patent Number: 4,477,097
[45] Date of Patent: Oct. 16, 1984

[54] NON-RIGID MOTORCYCLE SIDECAR CHASSIS WITH RIGID LOCK DEVICE

[76] Inventor: A. K. Bobo Hayes, Route 1, Box 190 W-4, Homosassa, Fla. 32646

[21] Appl. No.: 453,523

[22] Filed: Dec. 27, 1982

[51] Int. Cl.³ .................................................. B62K 27/02
[52] U.S. Cl. ...................................... 280/203; 180/210
[58] Field of Search ................ 180/209, 210; 280/203

[56] References Cited

U.S. PATENT DOCUMENTS

| | | | |
|---|---|---|---|
| 1,094,777 | 4/1914 | Buckland | 280/203 |
| 1,332,042 | 2/1920 | Johnston | 280/203 |
| 2,514,900 | 7/1950 | Ritze | 280/203 |
| 2,822,879 | 2/1958 | Overton | 180/11 |
| 3,949,335 | 4/1976 | Vetter | 180/209 |
| 4,088,199 | 5/1978 | Trautwein | 180/209 |
| 4,133,402 | 1/1979 | SooHoo | 180/209 |
| 4,221,276 | 9/1980 | Mitchell et al. | 180/209 |
| 4,385,770 | 5/1983 | Mitchell | 280/203 |

FOREIGN PATENT DOCUMENTS 582068 12/1924 France ................................. 280/203
15623 4/1912 United Kingdom ................ 280/203

Primary Examiner—David M. Mitchell
Assistant Examiner—D. Lynn Fugate
Attorney, Agent, or Firm—Ronald E. Smith

[57] ABSTRACT

A non-rigid motorcycle side car chassis having a rigid lock device. The side car frame is pivotally connected to the motorcycle frame, so that when the motorcycle is turning left or right, the side car will not hinder or impede such turning. A locking device is diagonally disposed between the motorcycle frame and the side car frame, and is locked when the vehicle is parked or moving at a slow speed, to thereby orient the respective frames in orthogonal relation to one another. The wheel of the side car is pivotally mounted so that it turns toward the direction of travel as the motorcycle turns, and an elongate bias means serves to limit the travel of such wheel and to dampen the turning action.

6 Claims, 7 Drawing Figures

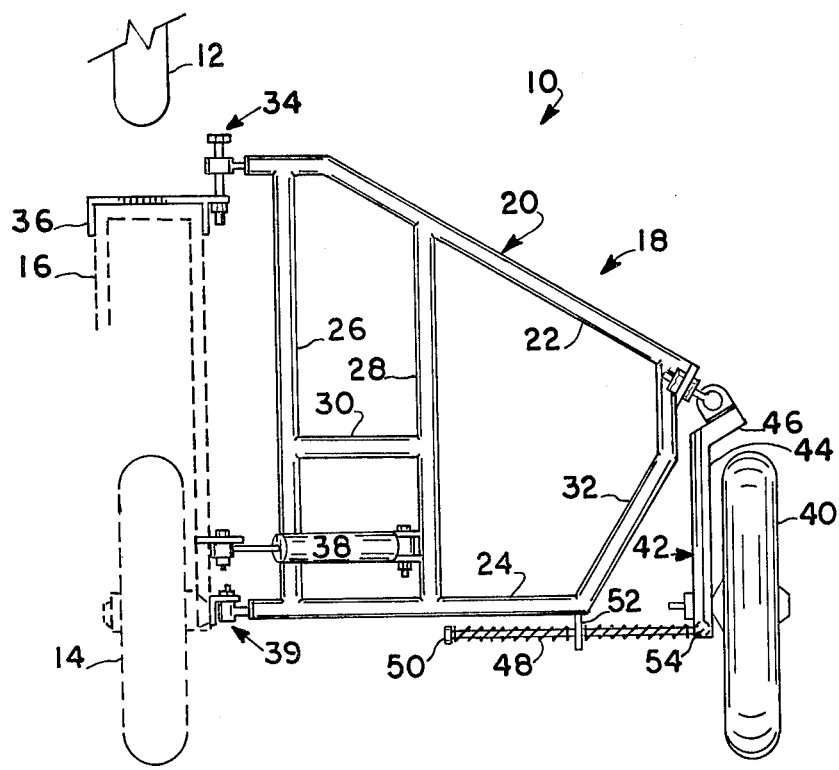
FIG_1
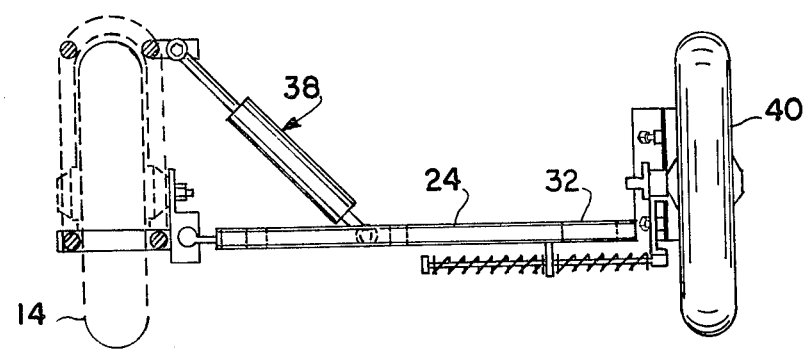
FIG_2

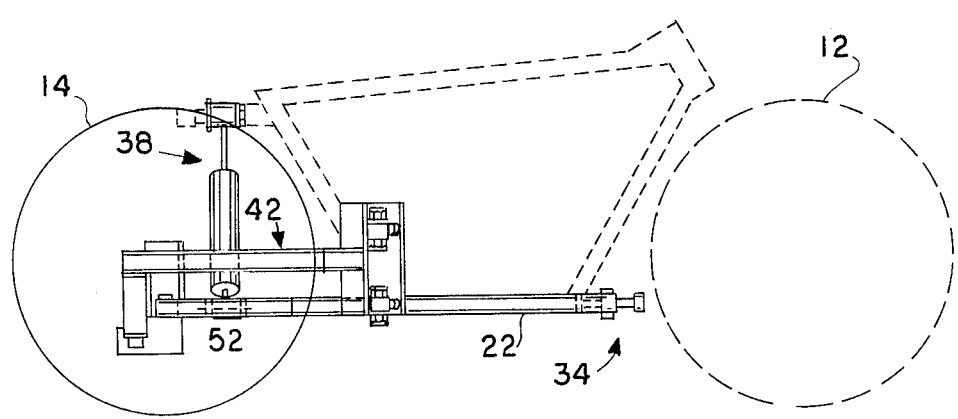
FIG_3

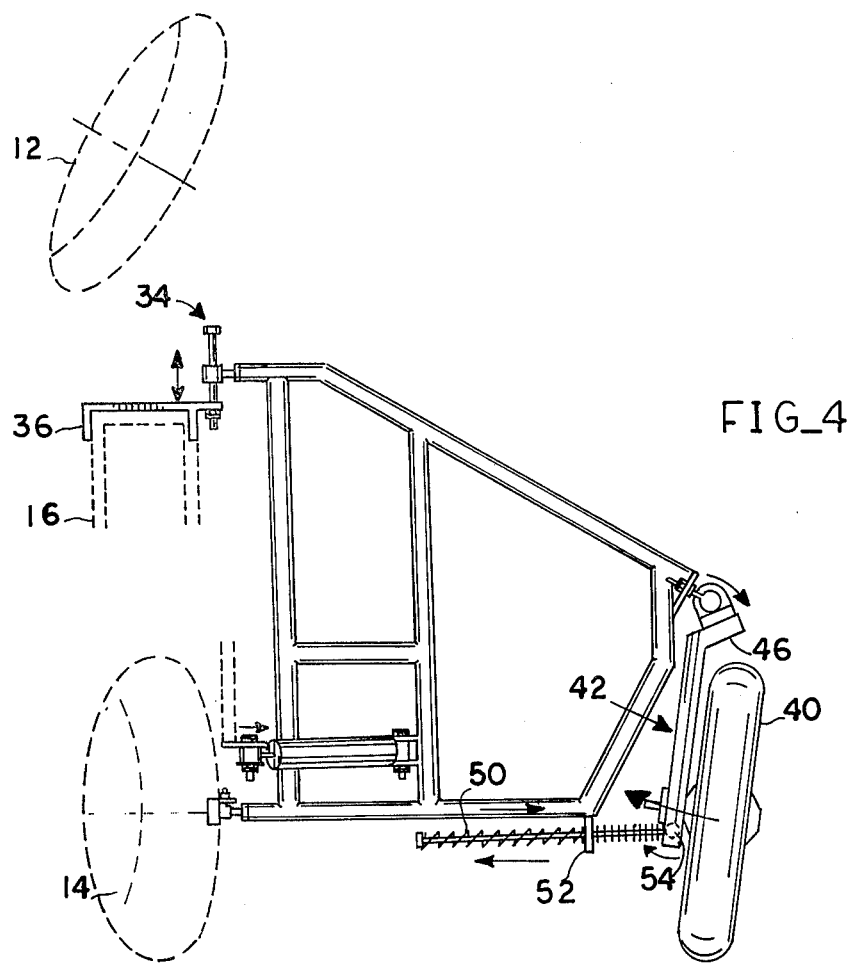
FIG_4
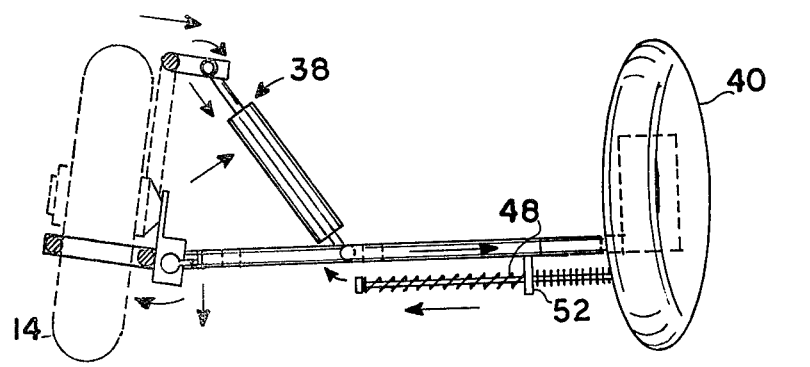
FIG_5

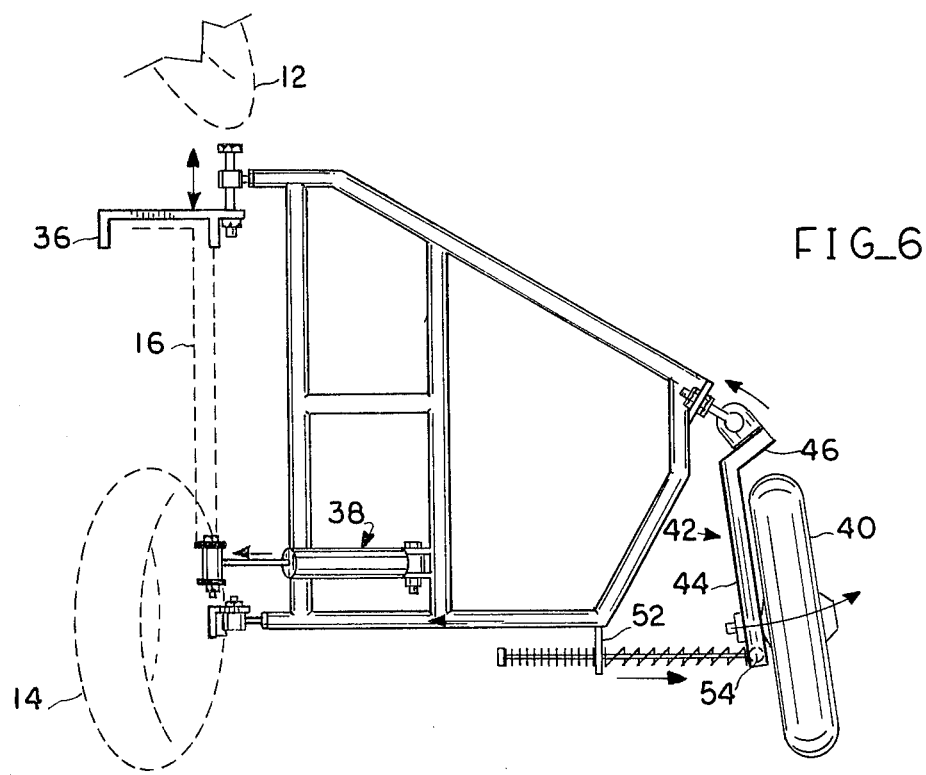
FIG_6
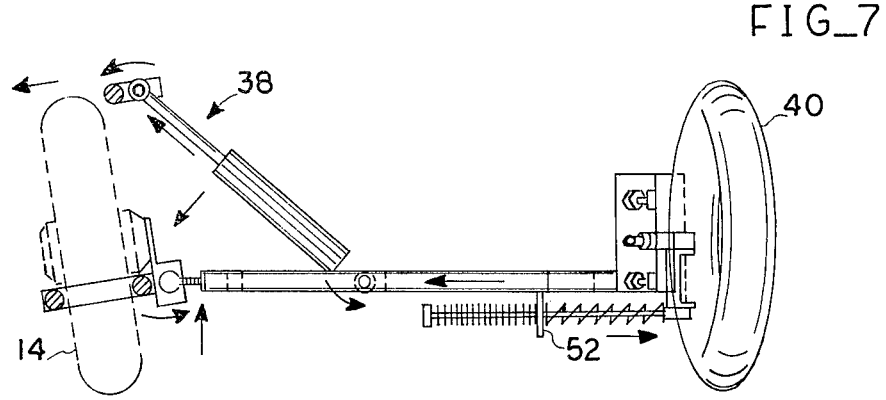
FIG_7

NON-RIGID MOTORCYCLE SIDECAR CHASSIS WITH RIGID LOCK DEVICE

BACKGROUND OF THE INVENTION

1. Field of the Invention

This invention relates generally to constructions for motorcycle side cars, and more specifically relates to a side car that is not rigidly connected to the motorcycle frame.

2. Description of the Prior Art

A search of United States patents that was conducted prior to the filing of this disclosure found the following U.S. Pat. Nos. 2,514,900; 2,822,879; 3,948,335; 4,088,199; 4,133,402; and 4,221,276.

All of the known side car constructions are in the form of a unit that is rigidly connected to the motorcycle. Thus, when the motorcycle is turning left, the outer wheel of the side car tends to lift from the road surface. When the motorcycle is turning right, the side car tends to impede such turning action. As a result of the rigid communication between the motorcycle and the side car, motorcycle/side car operators are required to exercise the utmost caution during turns, and failure to exercise such caution can result in accidents.

The inventor herein is aware of another attempt to overcome the side car rigidity problem, although the search found no patents relating to such attempt. The construction referred to mounts a wheel under the side car about midway between the motorcycle and the outer edge of the side car frame. Thus, the rider in the side car must perform a balancing act whenever the motorcycle is turning, and at least one accident is known to have occurred as a result of the extreme difficulty in balancing such an apparatus.

There is a need for a side car that will not impede the turning of the motorcycle to which it is connected, and that will allow a passenger seated in the side car to remain passive during the turning operation. Ideally, a new side car apparatus would provide means allowing the side car wheel to turn and would also provide means that would allow the side car to be rigidly connected to the motorcycle under appropriate circumstances.

The needed side car does not appear in the prior art.

SUMMARY OF THE INVENTION

The longstanding but heretofore unfulfilled need for a non-rigid motorcycle side car chassis is now provided in the form of a side car that is pivotally mounted to the motorcycle frame. A diagonally disposed shock absorber-type means interconnects the motorcycle frame and the side car frame so that when the shock absorber means is locked, the motorcycle and side car are rigidly connected to one another, as in conventional constructions.

The side car wheel is mounted at the outer edge of the side car, as in conventional side cars, but is specifically provided with means that allow it to turn in the direction of motorcycle travel. The turning means comprises an arm member that is pivotally connected to the side car frame, at its forward edge. The rearward end of the arm member is connected to the rearward edge of the side car frame through an elongate bias means that serves to limit the amount of wheel turning and which also serves to dampen the effects of the turn as well.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 1 is a top plan view of the preferred embodiment of the invention.

FIG. 2 is a rear elevational view of the embodiment shown in FIG. 1.

FIG. 3 is a side elevational view of such embodiment.

FIG. 4 is a top plan view of the preferred embodiment of the invention, showing a rightward direction of travel for the motorcycle and the side car.

FIG. 5 is a rear elevational view of the apparatus shown in FIG. 4.

FIG. 6 is a top plan view of the preferred embodiment of the invention when the motorcycle and side car are turning left.

FIG. 7 is a rear elevational view of the embodiment shown in FIG. 6.

DETAILED DESCRIPTION OF THE PREFERRED EMBODIMENT

Referring now to FIG. 1, it will there be seen that an embodiment of the invention that illustrates the basic concept thereof is designated by the reference numeral 10 as a whole. The conventional portion of the assembly includes the front wheel 12 of a conventional motorcycle, the rear wheel 14 of a conventional motorcycle, and a standard frame portion 16. The novel side car is designated generally by the reference numeral 18, and includes a frame 20 that lies in a horizontal plane at all times, whether the motorcycle is traveling forward or turning in any direction. When the motorcycle is traveling in a forward direction, the vertical axis of symmetry of the motorcycle is orthogonal to the horizontal axis of symmetry of the side car. However, as shown in FIG. 4, when the motorcycle is turning right, such respective axes of symmetry will form an acute angle. Furthermore, as shown in FIG. 7, when the motorcycle is turning left, the respective axes of symmetry will form an obtuse angle.

Returning now to FIG. 1, it will be seen that the frame 20 includes a leading edge 22 that has a minor portion disposed at right angles to the motorcycle, but which has a major portion that is swept back as shown. The trailing edge 24 of the side car is interconnected to the leading edge 22 by parallel, longitudinally disposed brace members 26, 28 that are in turn interconnected, for strength purposes, by a transverse brace 30. The outer ends of the leading and trailing edges of the side car are interconnected by a rectilinear member 32 having a bend formed therein as shown. As perhaps best seen in FIG. 1, the leading edge 22 of the side car frame 20 is pivotally connected to the motorcycle frame 16 at a load-compensating front connection means 34, which means is fixedly secured to a mounting bracket 36 that in turn is fixedly secured to such motorcycle frame 16. The trailing edge 24 of the side car chassis 20 is also pivotally mounted to the motorcycle as at 39.

From an inspection of FIG. 2, it should be clear that when the diagonally disposed locking device 38 is locked, the side car frame 20 will be rigidly connected to the motorcycle frame 16. However, when the locking device 38 is unlocked, the hinged connection between the motorcycle frame and the side car frame will allow the motorcycle to lean left or right independently of the side car frame.

The pivotal connection between the side car and the motorcycle frame is new and unique. However, another feature of the inventive apparatus that sharply distinguishes it from earlier side cars is its mounting of the side car wheel 40. It is critical to note that the side car wheel 40 is mounted independently of the side car frame 20. More specifically, the wheel 40 is rotatably mounted to a trailing swing arm 42 that has a major portion 44 disposed at right angles to the axis of rotation of the wheel, and a minor portion 46 disposed in angular relation thereto, as shown. The length of the trailing swing arm 42 and the angle of sweep of the side car frame leading edge 22 are specifically chosen so that the distal end of the frame leading edge 22 and the leading portion of the swing arm 42 are cooperatively positioned relative to one another so that they can be pivotally interconnected.

As shown in FIG. 4, when the motorcycle is turning right, the swing arm 42 will pivot in a clockwise direction relative to a horizontal plane, and as shown in FIG. 6, when the motorcycle is turning to the left the swing arm will move in a counter clockwise direction.

The pivotal interconnection of the motorcycle and the side car, coupled with the turning of the side car wheel in the direction of motorcycle travel, together provide an apparatus having enhanced utility vis a vis the side car constructions of the prior art.

To further improve the operation of the motorcycle/side car assembly, it has been found advantageous to provide an elongate bias means 48 to both limit the amount of turning that the side car wheel can undergo, and to dampen the effects of the turns. The bias means 48 is coiled about a rigid support means 50 that is spaced rearwardly of and downwardly from the side car frame 20. A guide and stop means 52 is fixedly secured to the trailing edge 24 of the frame as shown in all the drawings, and bifurcates the bias means 48 when the motorcycle is at rest or traveling in a forward direction, as best shown in FIGS. 1 and 2. When the motorcycle is turning right, as shown in FIG. 4, the rigid rod member 50 will be displaced to the left attendant the aforementioned clockwise turning of the swing arm 42, it being understood that such rod means 50 is pivotally connected to the rearmost end of the swing arm 52 as at 54. The guide and stop means 52 which bifurcates the bias means 48 serves to prevent uniform compression or expansion of such bias means. Specifically, as shown in FIG. 4, during a right turn the half of the bias means to the left of the guide and stop means will expand while the half of the bias means to the right of the guide and stop means will compress. As best seen in FIGS. 6 and 7, the opposite phenomenon will be observed when the vehicle is turning left. The effect of the bias means is to both limit the amount of turning undergone by the side car wheel, and to dampen the effects of the turning so that the operator of the motorcycle need not compensate for the existence of the side car at any time.

Those skilled in the art of machine design will be able to construct a number of side car devices in view of the teachings of this invention, since the concept can be expressed in a variety of embodiments. The invention is, of course, not limited to the specific embodiments shown and described herein, and includes all of the obvious variations to be disclosed structure.

It will thus be seen that the objects set forth above and those made apparent by the preceding description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

That which is claimed is:

1. A motorcycle and side car assembly, comprising, a side car frame having a swept back leading edge, means for pivotally mounting said side car frame to a motorcycle so that said motorcycle can be tilted relative to its vertical axis of symmetry independently of said side car, a side car wheel member disposed in laterally spaced, axial alignment with a rear wheel of a motorcycle, said side car wheel member mounted independently of said side car frame, said car wheel steering means to steer said side car wheel member, said side car steering means adapted to communicate turns of a forward wheel of said motorcycle to said side car wheel so that said side car wheel turns substantially simultaneously therewith and in a direction corresponding to the direction of turn of said forward wheel, a swing arm member to which said wheel member is rotatably mounted, said swing arm member including a linear in configuration major portion disposed in a first position substantially parallel to the motorcycle when said motorcycle is traveling in a forward direction and disposed oblique to said first position when said motorcycle is turning, said swing arm member including a minor portion angularly disposed to said major portion, a forward portion of said swept back frame member leading edge pivotally secured to a frame portion of said motorcycle just rearward of a forward wheel of said motorcycle, a rearward portion of said swept back frame member leading edge pivotally connected to said angularly disposed swing arm minor portion, said swept back frame member leading edge being substantially linear in configuration and specifically disposed to communicate turning forces appearing at its forwardmost end just rearwardly of said forward motorcycle wheel to said swing arm member along its extent so that stresses appearing thereon as a result of said turning are distributed along said extent, said stresses appearing on said leading edge being purely compressional or tensional for only one turn angle in each direction, said stresses appearing on said leading edge being a vector sum of bending and compressional or tensional forces for all other turn angles, whereby the swept back design of said leading edge is subjected to reduced bending forces during turning of said motorcycle.

2. The assembly of claim 1, further comprising, a locking means that interconnects said motorcycle and said side car frame, said locking means being selectively lockable and unlockable so that said motorcycle and said side car frame can be rigidly interconnected at right angles to one another when said locking means is locked, and so that said motorcycle and side car frame may be pivotally interconnected when said locking means is unlocked.

3. The assembly of claim 2, wherein a turn limiting and dampening means is provided to limit the amount of said side car wheel's turning and to attenuate the forces acting thereon during such turn.

4. The assembly of claim 3, wherein said limiting and dampening means includes an elongate, horizontally disposed rod member that is pivotally secured to the rearmost portion of said swing arm member, so that said rod member displaces in a lateral direction coincident with its own longitudinal axis of symmetry responsive to turning of said wheel in either direction.

5. The assembly of claim 4, wherein a guide means is fixedly secured to a trailing edge of said side car frame to slideably mount said rod member in substantially parallel disposition to said frame trailing edge, said guide means cooperating with the pivotal connection between said rod member and said swing arm member to maintain the movement of said rod member along its longitudinal axis of symmetry.

6. The assembly of claim 5, further comprising an elongate bias means disposed in surrounding relation to said rod member along its length, said elongate bias means being bifurcated into two substantially equal half portions so that when said rod member displaces along its longitudinal axis of symmetry in a first direction, a first half portion of said bias means will expand and a second half portion of said bias means will compress, and so that when said rod member displaces along its longitudinal axis of symmetry in a second direction, said first half portion of said bias means will compress and a second said half portion of said bias means will expand.

* * * * *